W. F. KETCHUM.
Harvester.
No. 466. Reissued June 2, 1857.
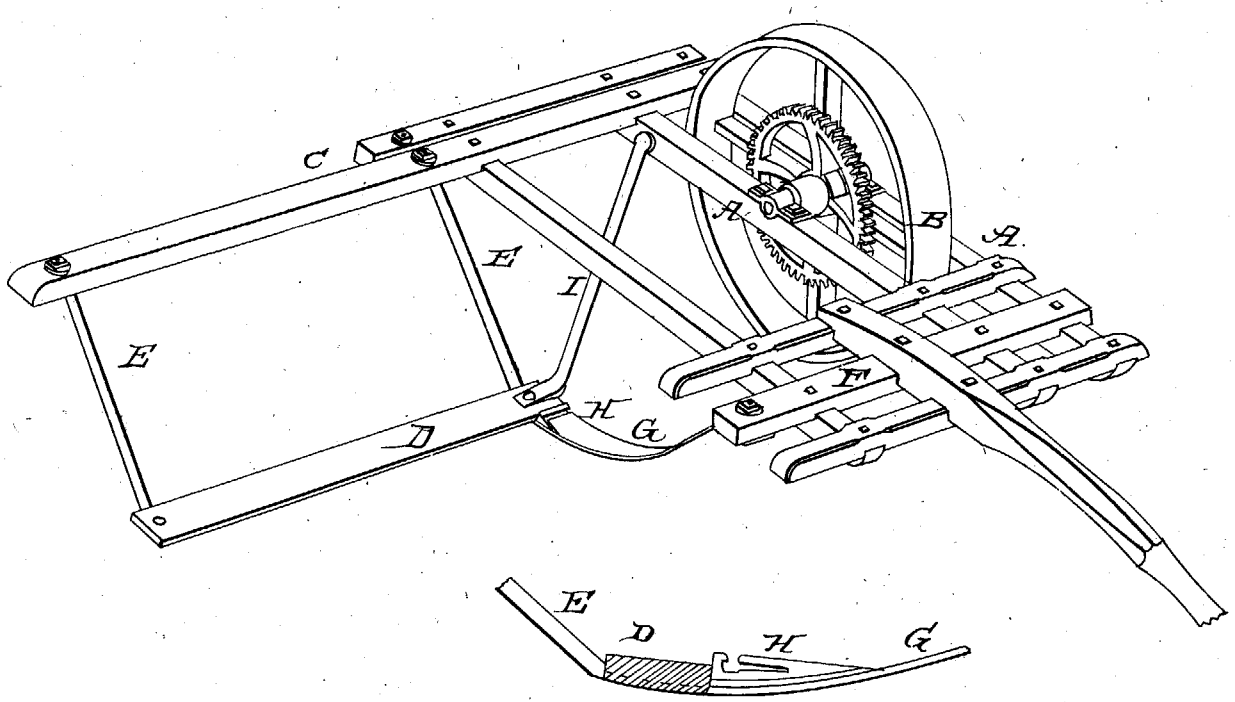
N. PETERS, Photo-Lithographer, Washington, D. C.

UNITED STATES PATENT OFFICE.

WM. F. KETCHUM, OF BUFFALO, NEW YORK.

IMPROVEMENT IN GRASS-HARVESTERS.

Specification forming part of Letters Patent No. 8,724, dated February 10, 1852; Reissue No. 259, dated February 28, 1854; Reissue No. 466, dated June 2, 1857.

*To all whom it may concern:*

Be it known that I, WILLIAM F. KETCHUM, of the city of Buffalo, in the county of Erie and State of New York, have invented new and useful Improvements in Grass and Grain Cutting Machines; and I do hereby declare that the following is a full and exact description thereof, reference being had to the accompanying drawing, and to the letters of reference marked thereon.

My improvements consist in a new and useful mode of supporting the rack or finger bar near to the ground at the side of the main frame and wheel, while the main frame is nearly horizontal in the line of draft, at such height as to accommodate a large main wheel, avoid clogging, &c.; and, also, in a new and useful mode of carrying the heel of the rack or finger bar over the cut grass and communicating the draft directly thereto, to prevent leverage, lateral strain, &c., by means of an extended shoe, as will be presently described.

The main frame of my machine consists of two strong longitudinal bars united together at each end by cross-bars firmly bolted thereto. This frame is supported by a wheel, say, three or four feet in diameter, placed in the space between its longitudinal and cross bars, the ends of whose axle enter into boxes on the longitudinal bars. This is the main wheel of the machine, upon which mainly it travels, and may be so geared with the cutter as to vibrate it by the revolution of the wheel in traveling.

The rack or finger bar D, which supports the cutter, I place in a horizontal position at the side of the main frame, and nearly perpendicular thereto, but much nearer the ground, in order to cut sufficiently close. The inner end of this rack or finger bar, which is at the inner end of the cutter, may be nearer to or farther from the wheel; but I prefer to place it, as shown in the drawing, several feet therefrom, as in that position it works much better in practical use. It may also be placed farther forward or farther back than represented in the drawing; but I much prefer it to be placed, as represented, nearly in the same vertical plane with the axis, as this position has, in my opinion, many advantages over any other; but my improvements are alike applicable to these changes of position. The cross-bar in front should be extended out on the side next the cutter-bar for the reception of the rear end of the tongue or shaft by which the machine is drawn and guided, and they should be halved and bolted or otherwise firmly fixed together, so that the tongue cannot have lateral motion without communicating it to the machine. The position of the tongue laterally should depend upon the distance of the heel of the cutter from the traveling or main wheel, in order to equalize the draft or diminish side draft when the machine is in operation.

To give support to the rack or finger bar D, I extend one of the cross-bars of the frame outward behind the rack or finger bar and carry downward therefrom to the finger-bar arms or braces E E. These arms are so connected with the cross-bar and finger-bar as to preserve their relative positions, as fully shown in the drawing. I also use the brace I to support the inner end of the rack or finger bar. I place what I call a "shoe," H G, inclining upward as it extends forward, to enable the heel of the rack or finger bar and the heel of the cutter to slide over obstructions and over the mowed grass which may lie in its path, and also to keep the grass out of the opening through which the heel of the cutter slides. This shoe I extend upward and forward to the front part of the frame and bolt it firmly thereto, as shown in the drawing. At the same time, therefore, that the shoe thus extended enables the heel of the finger-bar to slide over obstructions it gives support to the heel of the cutter-bar and communicates the draft directly thereto; but it is easy to see that by giving additional strength to some of the parts others might be dispensed with.

By giving very firm support to the rack or finger bar at the heel and making it heavier and stiffer the support at the outer end might be omitted, and consequently the outer part of the cross-bar C. The brace E at the heel might also be omitted, and also the whole extension of the rear cross-bar, by giving strength enough to the extended shoe and brace I; and it may be further remarked that the support of the finger-bar from the rear might be made so strong as to dispense with any support from the continuation of the shoe; but I prefer in most cases, especially for mowing, to support the finger bar in the precise manner represented, as being lighter and the materials better disposed, and making the whole machine more perfect.

Having described my improvements, what I claim therein, and desire to secure by Letters Patent, is—

1. Extending the shoe H G from the heel of the rack or finger bar upward and forward and firmly connecting its continuation with the draft when the finger-bar is located as set forth, so that the power by which the machine is drawn shall, through the shoe, be communicated to and draw forward the heel of the rack or finger bar, thus relieving the great strain which would otherwise come upon the lateral connections of the rack or finger bar with the wheel-frame, while the heel is enabled to slide over obstructions, substantially as shown.

2. When the main wheel and inner end of the finger-bar or rack D and located relatively as described, continuing the shoe H G from the heel of the rack or finger bar upward and forward until the upper end of its extension reaches a part of the machine which always runs above the mowed grass, and which will keep the said grass down and prevent its rising over the point of the extended shoe, thus aiding the shoe to ride over the mowed grass, even when accumulated before it, substantially as shown.

3. Supporting the heel of the rack or finger bar sufficiently near the ground and at a convenient distance laterally from the main wheel by arms extending upward and forward and upward and backward therefrom, and connected with the frame or strong bars firmly bolted across the frame in front and rear of the said rack or finger bar, while the said frame and bars are elevated to pass over the cut grass, and the above parts are arranged substantially as shown.

4. Supporting the rock or finger bar at the side of and lower than the main frame by means of auxiliary framing in a fixed position at the side thereof, and extending downward and forward, so that while the finger-bar is held as near the ground as desired, and lower than the main frame, the main frame may be nearly horizontal in the line of draft, and at any convenient height to avoid clogging or accommodate the diameter of the main wheel, as shown. Such an auxiliary frame as a whole is shown in the drawing, composed of bar C, rods E E I, and rack or finger bar D; but its details may of course be varied while the principle of my invention is retained.

5. Supporting the rack or finger bar D in its position at the side of and lower than the main frame by extending a strong bar, C, behind said rack or finger bar, firmly supported by said frame, and rigidly connecting said rack or finger bar to said bar C by a straight brace or braces, E E, said frame being elevated and said bar being elevated and placed sufficiently in rear of said rack or finger bar to avoid clogging or lodging of the mowed or falling grass against either, when said parts are arranged in relation to each other substantially as shown.

6. Supporting the outer end of the rack or finger bar by a rod extending downward and forward from the cross-bar C to the finger-bar parallel, or nearly so, to the face of the main wheel, when the frame and bar C are elevated above the rack or finger bar in the manner and for the purposes contemplated in the last claim, to avoid the falling or clogging of the cut grass against such rod, as set forth.

WM. F. KETCHUM.

Witnesses:
W. S. SHAW,
GEO. H. HUGHSON.